July 7, 1953  L. E. OBERHOLTZ ET AL  2,644,292
FEEDING CYLINDER
Filed June 8, 1951

INVENTORS
Lester E. Oberholtz and
Gene Allen
BY Fishburn + Mullendore
ATTORNEYS.

Patented July 7, 1953

2,644,292

UNITED STATES PATENT OFFICE 2,644,292

FEEDING CYLINDER

Lester E. Oberholtz and Gene Allen, Independence, Mo., assignors to Gleaner Harvester Corporation, Independence, Mo., a corporation of Delaware Application June 8, 1951, Serial No. 230,546

4 Claims. (Cl. 56—364)

This invention relates to a feed cylinder or conveyor having projectable and retractable fingers. The present invention pertains primarily to the feed or conveyor cylinders and particularly to mounting of the fingers, the principal object being to provide a structure which provides for easy removal and replacement of the fingers when necessary. Another object is to provide a resilient and free acting support for the fingers.

It is a further object of the invention to provide a shock resistant and substantially noiseless mounting of the fingers in the feed or conveyor cylinders.

In accomplishing these and other objects of the invention hereinafter pointed out, we have provided improved structure, the preferred form of which is illustrated in the accompanying drawing wherein.

Figure 1:
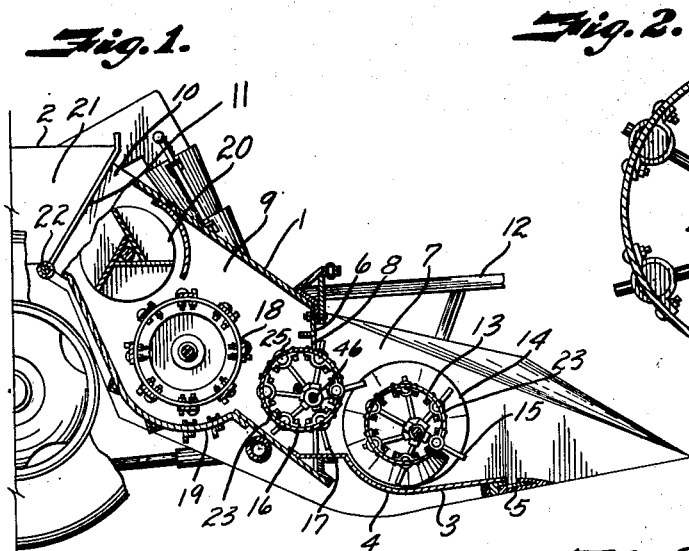
Fig. 1 is a longitudinal central vertical section through a self-propelled combine which includes feed and conveyor cylinders having projectable and retractable fingers removably mounted therein in accordance with the present invention.

Referring more in detail to the drawings:

1 designates a harvesting and threshing unit and 2 the separating unit of a self-propelled combine of the type disclosed in the above mentioned application. The harvesting and threshing unit is carried from the separating unit for adjustment to the height of the grain to be harvested. The harvesting and threshing unit 1 includes a transverse grain pan 3 having ends arranged symmetrically with the longitudinal median line of the separating unit. The grain pan includes a trough-like bottom 4 having a sickle 5 extending along the front edge thereof for cutting the grain. The opposite side of the pan includes a back or wind board 6 that extends a substantial distance above the bottom. The ends of the pan are closed by end walls 7 which are fixed to the bottom 3 and back board 6. Formed in the back board 6 at the longitudinal center of the pan is a discharge opening 8 and rigidly connected with the pan in alignment with the opening 8 is a threshing cylinder housing 9 of substantially rectangular cross section and having a discharge end 10 projecting into an open front end 11 of the separator unit 2. The harvesting and separating unit also includes the customary reel (not shown) but which is carried at the ends of the pan on arms 12. Rotatably mounted in the grain pan is a tubular conveyor shaft or cylinder 13 which is provided with right and left spiral flights 14 at the respective ends thereof and which terminate adjacent the respective sides of the discharge opening 8 so that when the cylinder is rotated, the spirals move cut grain along the bottom of the pan from the outer ends toward the discharge opening 8 from which point the cut grain is discharged into the thresher housing 9, by means of fingers 15 movably mounted in the cylinder 13 in accordance with the present invention.

Located within the opening 8 is a feed cylinder 16 having similar fingers 17 to assist in discharge of the cut grain to a threshing cylinder 18 and a concave 19 carried within the housing 9, after which the threshed grain is discharged by the cylinder 18 into the separator unit 2 with the aid of a beater 20.

The entire harvesting and threshing unit thus far described is pivotally mounted on the housing 21 of the separator unit by means of a transverse shaft 22 which provides the power shaft for the driving mechanisms (not shown) to actuate the conveyor cylinder 13, feed cylinder 16, threshing cylinder 18, and beater 20.

Figure 2:
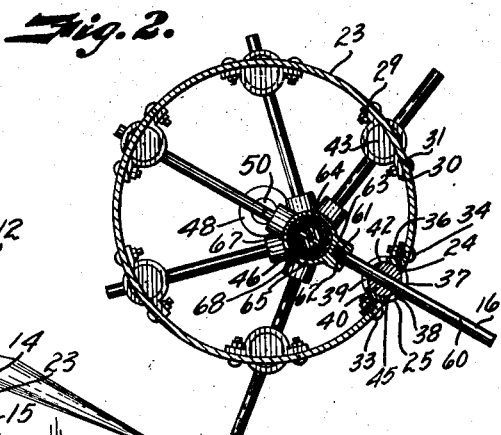
Fig. 2 is an enlarged cross section through one of the cylinders.
Figure 4:
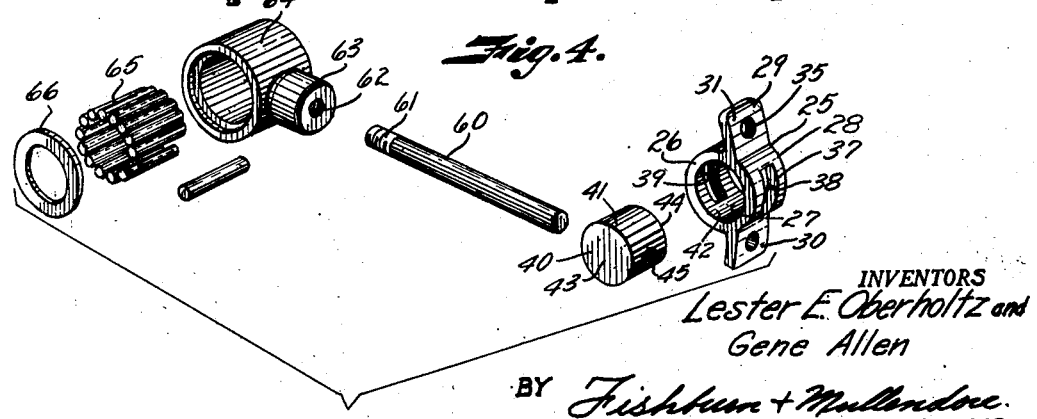
Fig. 4 is a perspective view of one of the removable fingers and mounting parts therefor, the parts being shown in disassembled spaced relation and enlarged to better illustrate their construction.

The feed cylinder 16 and the portion of the conveyor cylinder 13 that extends across the width of the opening 8 include annular walls 23 that are preferably formed of sheet metal and have a plurality of circumferential and longitudinally spaced substantially rectangular apertures 24 in which bearing brackets 25 are mounted. Each bearing bracket includes a sleeve portion 26 having open ends 27 and 28. Extending from opposite sides of the sleeve portions 26 of the brackets are ears 29 and 30 curving in corresponding relation with the walls of the cylinders so that the outer faces 31 thereof are adapted to be secured in closely engaged contact with the inner surfaces 32 of the respective cylinders as best shown in Figs. 1 and 2, the brackets being secured in their respective openings by fastening devices such as bolts 33 and 34 having their shanks projected through openings 35 in the ears 29 and 30 and registering openings in the walls of the cylinders, the bolts being provided with nuts 36 by which the brackets are drawn into fixed engagement with the respective cylinders. When the brackets are thus attached, portions 37 thereof project slightly beyond the outer faces of the cylinders and formed therein are arcuate slots 38 which cooperate with similar arcuate slots 39 at the opposite and inner projecting portions of the brackets, as best shown in Fig. 4. Oscillatably mounted within the sleeve portions of the respective brackets are bearing members 40 of substantially cylindrical shape and of a size so that the circumferential faces 41 thereof rotate in bearing contact with the inner faces 42 of the bearing brackets. The bearing members have substantially flat ends 43 and 44 terminating in plane with the side faces of the sleeve portions. Each bearing member is provided with a diametric opening 45 which registers with the arcuate slots 38 and 39 to slidably mount the fingers 15 or 17 (Fig. 1) to be projected and retracted responsive to rotation of the respective cylinders. Each cylinder has a shaft 46 that is supported eccentrically of the axis of the respective cylinders by arms 47 and 48 in the case of the feed cylinder. The arms 47 and 48 are carried respectively by a stationary shaft 49 and a rotary power shaft 50.

Figure 3:
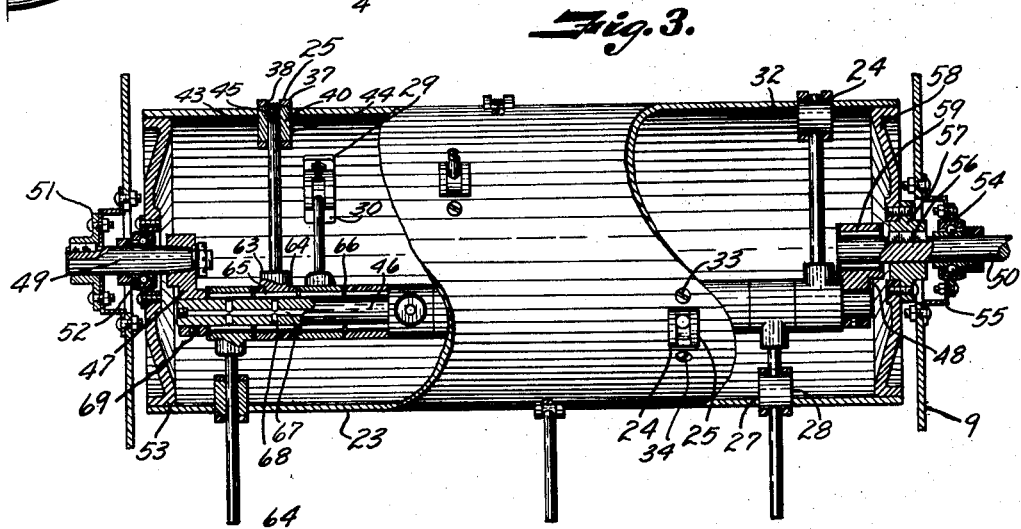
Fig. 3 is a plan view of the feed cylinder of the machine showing the ends thereof in section and with parts removed.

The shaft 49 for the feed cylinder is fixed by a bracket 51 that is mounted on the side wall of the housing 9 and the shaft carries an antifriction bearing 52 that journals the corresponding head 53 of the feed cylinder 16. The power shaft 50 is journalled within an antifriction bearing 54 that is carried by a bracket 55 on the opposite side wall of the housing 9 as best shown in Fig. 3. The feed cylinder is fixed in driving relation with the shaft 50 by a spline or key 56 that connects the rotary shaft with a hub 57 that is carried by the cylinder head 58. The power shaft 50 extends through the hub 57 and into the cylinder to journal the arm 48 on an antifriction bearing 59 thereon. Since the shaft 46 is held in stationary position within the feed cylinder by means of the arm 47 and the fixed shaft 49, the cylinder rotates freely therearound through its connection with the power shaft 50, the inner end of the shaft 50 turning freely within the arm 48 that carries that end of the eccentric shaft 46.

With the exception of length of the fixed and power shafts, the conveyor cylinder 13 is similarly equipped for effecting reciprocation of the fingers therein.

Each finger includes a rod-like member 60 preferably of circular cross-section and having a threaded inner end 61 engaged within a threaded socket 62 of a radial boss 63 on a sleeve-like bearing ring 64. The bearings 64 are journalled on the eccentric shaft 46 by means of antifriction bearings 65 that are mounted between the inner face of the bearing ring 64 and the shaft 46 in side to side relation and are spaced apart by washers 66. The shaft 46 may be provided with an axial bore 67 having radial ports 68 through which lubricant is supplied to the respective bearings 65, the lubricant being injected into the axial bore through a suitable fitting 69.

Since the fingers of the cylinder 13 are to divert the grain that is fed from the respective ends of the pan to the center thereof and to rake the grain that has been cut by the portion of the sickle bar directly in front of the discharge opening 8, the shaft for that cylinder is so arranged that the fingers start to project at their rear-most position and become fully projected at substantially 180° therefrom to sweep the grain across the pan in the direction of the discharge opening 8. As the fingers are carried across the bottom 3 they gradually retract into the cylinder so that they withdraw from the grain in front of the opening 8. The grain, however continues its movement because it is immediately engaged by the fingers of the feed cylinder. Since the fingers of the feed cylinder are to move the grain in the same direction, the eccentric shaft 46 is positioned in the same relation as the fixed shaft in the conveyor cylinder 13. That is, so that the fingers begin to project slightly at the rear-most position and become fully projected at substantially 180° therefrom to engage and catch the grain that strips from the retractively moving fingers of the cylinder 13. The fingers then move across the bottom of the housing 9 and discharge the cut grain upwardly therein into contact with the threshing cylinder, the cut grain being freed from the feed cylinder responsive to traction of the fingers as they begin to move upwardly incidental to rotation of the feed cylinder. In order to provide for quiet operation and to absorb shocks, the bearing or trunnion members 45 are preferably formed of resilient material, for example, rubber. Such material not only reduces shock and eliminates noise of the working parts but also provides good bearing surfaces with respect to the metal brackets and the fingers that slide therethrough.

It is thus obvious that the fingers or tines are reciprocated within the diametrically arranged opening 45 of the bearing members 41 and simultaneously the bearing members rock within the bearing faces of the respective brackets so that the fingers are supported and maintained in position to sweep the grain in the desired direction and to retract and free the grain when engaged by the succeeding mechanisms so as to effect continuous feed of the cut grain into the threshing cylinder.

It is also obvious that rotation of the respective cylinders provide the motive power for slidably actuating the fingers and that the relative projections of the fingers are dependent upon the eccentric relationship of the fixed shaft 46 to the axis of the cylinders.

In case the fingers should bend or require replacement they are readily removed by turning them out of the threaded sockets 62 and withdrawing them through the openings 45. The screw fingers are then applied by projecting the threaded ends thereof through the openings 45 and engaged with the threaded sockets.

From the foregoing, it is obvious that we have provided a feed or conveyor cylinder of the like with retractable and projectable fingers which are easily replaceable and mounted to prevent looseness of parts and to assure positive and quiet operation. It is also obvious that the resilient mounting eliminates strains and stresses on the antifriction bearings and provides for absorption of shocks that might be imparted through the fingers or tines.

What we claim and desire to secure by Letters Patent is:

1. A feeding device of the type including a hollow cylinder having the cylindrical wall thereof providing with an opening, a fixed shaft in the axis of the cylinder and about which the cylinder rotates and having a crank portion contained within the hollow cylinder and a finger mechanism carried by the cylinder and connected with the crank portion of the shaft to effect projection and retraction of the finger through said cylinder opening, wherein said finger mechanism includes a bearing member having a cylindrical sleeve portion extending transversely within said opening of said hollow cylinder with a side portion thereof closing said opening and provided with a slot in said side portion and a corresponding slot in the opposite diametrical side of said sleeve portion, means for removably fixing the bearing member to the cylinder, a cylindrical guide member closely fitting within the sleeve portion of the bearing member and oscillatable therein in closing relation with slot-like openings in the sleeve portion of the bearing member and having a dimetrically extending bore registering with the slot-like openings, a sleeve member on the crank portion, and a finger extending through the slot-like openings of the sleeve portion of the bearing member and slidably mounted in the bore of the guide member and having an end removably connected with the sleeve member on the crank portion of said shaft.

2. A structure as described in claim 1 wherein the finger guide is formed of resilient material.

3. A feeding device of the type including a hollow cylinder having the cylindrical wall thereof provided with an opening, a fixed shaft in the axis of the cylinder and about which the cylinder rotates and having a crank portion contained within the hollow cylinder and a finger mechanism carried by the cylinder and connected with the crank portion of the shaft to effect projection and retraction of the finger through said cylinder opening, wherein said finger mechanism includes a bearing member having a cylindrical sleeve portion extending transversely within said opening with a side portion thereof completely closing said opening and provided with a slot in said portion and a corresponding slot in the opposite diametrical side of the sleeve portion, said cylindrical portion of the bearing member having open ends, means for removably fixing the bearing member to the cylinder with said open ends in contact with ends of the cylinder opening, a cylindrical guide member closely oscillatable within the sleeve portion of the bearing member in closing relation with slot-like openings in the sleeve portions of the bearing member and having ends engaging the cylinder at ends of the opening therein, said guide member having a bore registering with the slot-like openings, a sleeve member on the crank portion of said shaft, and a rod-like finger extending through the slot-like openings of the sleeve portion of the bearing member and slidable in the bore of the guide member and removably connected with the sleeve member.

4. A structure as described in claim 3 wherein the finger guide member is formed of resilient material.

LESTER E. OBERHOLTZ.
GENE ALLEN.

References Cited in the file of this patent

UNITED STATES PATENTS

| Number | Name | Date |
|---|---|---|
| 1,919,896 | McGregor | July 25, 1933 |
| 1,923,405 | Wickersham | Aug. 22, 1933 |
| 2,286,095 | Innes | June 9, 1942 |
| 2,328,278 | Innes | Aug. 31, 1943 |
| 2,417,905 | Blaydes | Mar. 25, 1947 |
| 2,455,905 | Ronning et al. | Dec. 7, 1948 |